United States Patent
Burke

(10) Patent No.: US 9,257,840 B2
(45) Date of Patent: Feb. 9, 2016

(54) SYNCHRONIZED PWM RANDOMIZATION FOR COORDINATED LOAD MANAGEMENT

(75) Inventor: William Jerome Burke, Louisville, KY (US)

(73) Assignee: General Electric Company, Schenectady, NY (US)

( * ) Notice: Subject to any disclaimer, the term of this patent is extended or adjusted under 35 U.S.C. 154(b) by 867 days.

(21) Appl. No.: 13/402,390

(22) Filed: Feb. 22, 2012

(65) Prior Publication Data

US 2013/0214598 A1 Aug. 22, 2013

(51) Int. Cl.
*H01H 47/00* (2006.01)
*H01H 51/34* (2006.01)
*H02J 3/00* (2006.01)
*G05B 15/02* (2006.01)
*H02J 3/14* (2006.01)

(52) U.S. Cl.
CPC . *H02J 3/00* (2013.01); *G05B 15/02* (2013.01); *G05B 2219/2642* (2013.01); *H02J 2003/143* (2013.01); *Y10T 307/406* (2015.04)

(58) Field of Classification Search
CPC ............. H02J 2003/146; H02J 2003/003; H02J 2003/143
USPC .............................. 307/31, 132 R
See application file for complete search history.

(56) References Cited

U.S. PATENT DOCUMENTS

| | | | | |
|---|---|---|---|---|
| 2007/0043478 | A1* | 2/2007 | Ehlers et al. | 700/276 |
| 2008/0030078 | A1* | 2/2008 | Whitted et al. | 307/66 |
| 2010/0222935 | A1* | 9/2010 | Forbes et al. | 700/291 |

OTHER PUBLICATIONS

William Burke, et al., PWM Synchronization for Intelligent Agent Scarce Resource Auction; Proceedings of the ASME 2009 Dynamic Systems and Control Conference; Oct. 12-14, 2009; pp. 6.
William Burke, et al., Low-Frequency Pulse Width Modulation Design for HVAC Compressors; Proceedings of the ASME 2009 Dynamic Systems and Control Conference; Aug. 30-Sep. 2, 2009; pp. 7.

* cited by examiner

*Primary Examiner* — Carlos Amaya
(74) *Attorney, Agent, or Firm* — Dority & Manning, P.A.

(57) ABSTRACT

A method of controlling a power consuming device includes receiving a control signal from a power supplying utility. The control signal signals a beginning of a control period. A length of time to operate the power consuming device during the control period is determined and an offset time is identified. A start time for operation of the power consuming device is identified as a function of the beginning of the control period and the offset time. A stop time for operation of the power consuming device is identified as a function of the start time and the determined length of time to operate the power consuming device.

20 Claims, 6 Drawing Sheets

SYNCHRONIZED PWM RANDOMIZATION FOR COORDINATED LOAD MANAGEMENT

BACKGROUND OF THE INVENTION

The embodiments described herein relate generally to load management and, more particularly, to low-frequency synchronized pulse width modulation (PWM) randomization for coordinated load management.

Together, a growing world population and increasing use of electric vehicles create increased demand for electricity. Accordingly, the price of energy tends to surge during peak times.

Currently, at least some known utilities use demand response systems that enable customers to enroll in at least one demand response program to manage the consumption of energy by their customers in response to supply conditions. These load management techniques are used to modify power consumption by consumers to better suit energy supply conditions. Such known demand response systems are commonly applied to power consuming devices such as, for example, air conditioners, electric water heaters, washing machines, pool pumps, etc. Examples of demand response programs include a direct control program, a critical peak pricing program, and a time of use program. The initiation and/or implementation of a demand response program by a utility is known as a demand response event. A demand response event is initiated by a utility transmitting a plurality of signals to its customers. For example, a demand response event representative of a direct load control program, is initiated when the utility transmits a signal to a device within a building, such as an in-home smart device and/or smart thermostat, such that the utility is enabled to directly control the usage of energy consuming machines within the building. A demand response event representative of a critical peak pricing program occurs when the utility transmits pricing signals to its customers during peak demand times. The pricing signals enable the utility to apprise customers of heightened energy prices during peak demand time periods such that customers may limit their energy consumption during such peak demand time periods. A demand response event representative of a time of use program occurs when the utility transmits a signal to a customer that is representative of energy prices that correspond to a time range such that the customer may identify an optimal time of day and/or day of the week to consume energy to ensure a low energy price rate.

In some known demand response systems power consuming devices are controlled in groups receiving synchronized signals. This may result in many devices being turned on and off simultaneously causing large spikes of demand as many devices in a group are turned on simultaneously.

BRIEF DESCRIPTION OF THE INVENTION

In one aspect, a method of controlling a power consuming device includes receiving a control signal from a power supplying utility. The control signal signals a beginning of a control period. The method includes determining a length of time to operate the power consuming device during the control period and identifying an offset time. The method includes identifying a start time for operation of the power consuming device as a function of the beginning of the control period and the offset time, and identifying a stop time for operation of the power consuming device as a function of the start time and the determined length of time to operate the power consuming device.

In another aspect, an apparatus for controlling operation of at least one power consuming device includes an input for receiving a control signal from a power supplying utility, and a processor coupled in communication with the input. The processor is programmed to receive a control signal from a power supplying utility via the input, the control signal signaling a beginning of a control period. The processor is programmed to determine a length of time to operate a power consuming device during the control period, identify an offset time, and identify a start time for operation of the power consuming device as a function of the beginning of the control period and the offset time.

In yet another aspect, a method of controlling power demand on a network supplied by a power utility using synchronized duty cycles is described. The method includes determining a demanded power target for the utility, comparing the monitored power consumption of the network to the demanded power target, and transmitting a control signal to a plurality of customers. The control signal indicates the beginning of a control period. The method includes transmitting a saturation signal to the plurality of customers, the saturation signal representing a maximum power usage threshold for each customer during the control period which is established by the utility to maintain the demanded power consumption at a level not greater than the demanded power target. The method includes monitoring power consumption on the network during the control period, and adjusting the threshold communicated by the saturation signal as needed to maintain the monitored power consumption at a level not significantly greater the demanded power target.

BRIEF DESCRIPTION OF THE DRAWINGS

FIG. 1 is a block diagram of an exemplary demand response system.

FIG. 2 is a block diagram of computing device for use in the demand response system shown in FIG. 1.

FIG. 3 is a block diagram of an exemplary controller for use in the demand response system shown in FIG. 1.

FIG. 4 is a flow diagram of an exemplary method for controlling a power consuming device.

FIG. 5 is a graph of the on and off times of a power consuming device according to the method shown in FIG. 4.

FIG. 6 is a graph of the on and off times of a power consuming device according to the method shown in FIG. 4.

FIG. 7 is a graph of normalized power for a simulated population of unconstrained dryers over a twenty-four hour period.

FIG. 8 is a graph of normalized power for a simulated population of dryers operated according to the method shown in FIG. 4 over a twenty-four hour period.

FIG. 9 is a graph of a saturation signal used for the simulation resulting in the graph shown in FIG. 8.

DETAILED DESCRIPTION OF THE INVENTION

The embodiments described herein enable synchronized control of power consuming devices using pulse width modulation (PWM) control techniques. Power consuming devices that are generally either off or on for a period of time (e.g., a heating, ventilation, and air conditioning compressor, a water heater, an irrigation pump, a pool pump, etc.) are controlled using low frequency PWM control (also referred to herein as duty cycle control). Time is divided into control periods having a generally fixed period on the order of minutes and a controller determines how long a power consuming device is to be operated (i.e., turned-on) during each control period to achieve a desired result, such as a desired temperature. The percentage of a control period during which a power consuming device is turned on is referred to as the duty cycle at which the device is operated. Embodiments described herein enable limiting of a duty cycle of such a power consuming device, and randomizing the start times of power consuming devices within a control period. Hence, the embodiments described herein enable load management and shaping, while limiting simultaneous turning on of a large number of power consuming devices.

Figure 1:
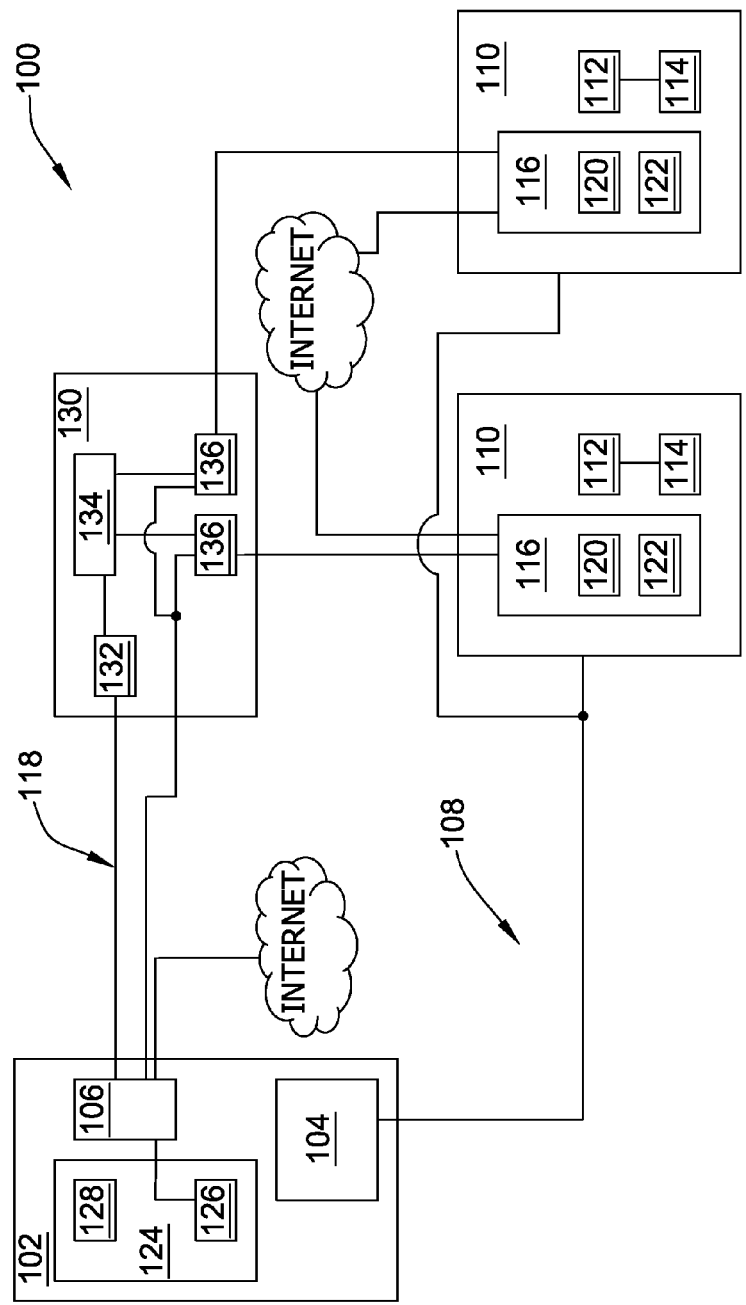
FIGS. 1-9 show exemplary embodiments of the apparatus and methods described herein.

FIG. 1 illustrates a demand response system 100. In the exemplary embodiment, demand response system 100 may include a utility provider 102. Utility 102 includes an electric power generation system 104 and a computing device 106. Computing device 106 enables utility 102 to communicate with customers and electric power generation system 104 supplies electrical power to customers via an electric network 108. Electric power generation system 104 may include a generator driven by, for example, a gas turbine engine, a hydroelectric turbine, a wind turbine, one or more solar panels, and/or another suitable generation system. In other embodiments, electric power generation system 104 may be positioned at a different location from computing device 106 and/or computing device 106 may not be positioned within utility 102 and may be positioned external to utility 102.

In the exemplary embodiment, computing device 106 is communicatively coupled to a plurality of recipients 110, such as buildings which may be occupied by a plurality of customers. It should be noted that, as used herein, the term "couple" is not limited to a direct mechanical, electrical, and/or communication connection between components, but may also include an indirect mechanical, electrical, and/or communication connection between multiple components.

In the exemplary embodiment, electric power generation system 104 is coupled to recipients 110, such as buildings, via an electric network 108 to provide power to recipients 110. More specifically, at least one of the recipients 110 includes a controller 112, which is coupled to one or more power consuming devices 114. Controller 112 is communicatively coupled to utility 102 and controls operation of power consuming device 114. Controller 112 is described in more detail below with respect to FIG. 3. Each power consuming device 114 may be any type of device that consumes electrical power including, for example, an electric water heater, an air conditioner, a pool pump, an electric dryer, etc.

In the illustrated embodiment, the electric network 108 is illustrated in a single line diagram. Electric network 108 may, however, include multiple wires carrying multiple phases of electric power, and recipients 110 may be connected to different phases of electric power. Further, electric network 108 may include additional elements including, for example, transformers, substations, switches, nodes, etc.

In the exemplary embodiment, computing device 106 is communicatively coupled to at least one user notification device 116 within each recipient 110 via a network 118 such that computing device 106 may communicate with user notification device 116. Network 118 may include a private network, a public network, the Internet, etc. In the exemplary embodiment, user notification device 116 may be a computer, a cellular phone, and/or a smart device, including a smart box and/or smart thermostat. Alternatively, user notification device 116 may be any other device that is configured to communicate with computing device 106. Moreover, in the exemplary embodiment, the user notification device 116 may be a home automation system. User notification device 116 includes a user interface 120 that receives at least one input from a user, such as a customer of utility 102. In other embodiments, user notification device 116 may not include user interface 120. In the exemplary embodiment, user interface 120 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone) that enables the user to input pertinent information.

Moreover, in the exemplary embodiment, user notification device 116 includes a presentation interface 122 that presents information, such as information regarding demand response programs and/or demand response events that are received from utility 102, input events and/or validation results, to the user. In the exemplary embodiment, presentation interface 122 includes a display adapter (not shown) that is coupled to at least one display device (not shown). More specifically, in the exemplary embodiment, the display device is a visual display device, such as a cathode ray tube (CRT), a liquid crystal display (LCD), an organic LED (OLED) display, and/or an "electronic ink" display. Alternatively, presentation interface 122 may include an audio output device (e.g., an audio adapter and/or a speaker) and/or a printer. In other embodiments, user notification device 116 may not include presentation interface 122.

In the exemplary embodiment, computing device 106 may communicate with user notification device 116 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, cellular phone technology (e.g., the Global Standard for Mobile communication (GSM)), a satellite communication link, and/or any other suitable communication means. More specifically, in the exemplary embodiment, user notification device 116 is configured to receive at least one signal from computing device 106 that is representative of at least one demand response event. In the exemplary embodiment, the demand response event initiates the implementation of a demand response program that may include a direct load control program, a critical peak pricing program, and/or a time of use program.

In the exemplary embodiment, utility 102 also includes a data management system 124 that is coupled to computing device 106. Data management system 124 may be any device capable of accessing network 118 including, without limitation, a desktop computer, a laptop computer, or other web-based connectable equipment. More specifically, in the exemplary embodiment, data management system 124 includes a database 126 that includes customer data for each of the customers of utility 102. In the exemplary embodiment, the customer data may include an enrollment period and/or an enrollment status for each customer for participating in at least one demand response program. For example, the data may include a selection made by each customer for at least one demand response program to participate in. The customer data may also include a participation history for each customer. The participation history may include, for example, the previous demand response events that each customer has participated in. The customer data may also include a geographic area of each customer, such as the geographic area where each customer resides. The customer data may include the phase of power utilized by each customer. The customer data may indicate what type of customer each customer is, such as commercial or residential. The customer data may indicate the types of power consuming devices used by each customer including, for example, electric water heaters, air conditioners, pool pumps, irrigation systems, electric dryers, etc.

Moreover, in the exemplary embodiment, data management system 124 includes a user interface 128 that receives at least one input from a user, such as an operator and/or employee of utility 102. In the exemplary embodiment, data management system user interface 128 may include, for example, a keyboard, a pointing device, a mouse, a stylus, a touch sensitive panel (e.g., a touch pad or a touch screen), a position detector, and/or an audio input interface (e.g., including a microphone) that enables the user to input pertinent information.

Data management system 124 may communicate with computing device 106 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, cellular phone technology (e.g., the Global Standard for Mobile communication (GSM)), a satellite communication link, and/or any other suitable communication means. More specifically, in the exemplary embodiment, data management system 124 transmits the customer data to computing device 106. While the customer data is shown as being stored in database 126 within data management system 124 in the exemplary embodiment, it should be noted that the customer data may be stored in another system and/or device. For example, computing device 106 may store the customer data therein.

In the exemplary embodiment, system 100 includes an advanced metering infrastructure (AMI) subsystem 130. AMI subsystem 130 includes a gateway 132 and a repeater 134 and AMI meters 136. Repeater 134 repeats or relays data to forward data between devices, such as computing device 106, gateway 132, AMI meters 136, user notification devices 116, etc. AMI meters 136 measure and/or detect an amount of electricity received and/or provided to one or more loads (such as power consuming devices 114) coupled to AMI meters 136. Meters 136 transmit data, such as electricity measurement data, to, and/or receive data from, other devices or systems within network 118 and/or AMI subsystem 130. Other embodiments may not include AMI subsystem 130 and/or computing device 106 may communicate directly with user notification devices, power consuming devices, etc.

In operation, power consuming devices 114 are controlled by controller 112 using a duty cycle control scheme. In general, power consuming devices 114 are devices that are either on or off. The percentage of a control period during which a device 114 is turned-on is referred to as a duty cycle. In the exemplary embodiment, utility 102 periodically transmits a control signal that represents the beginning of a control period. The control signal is received by controller 112 and used to establish the control period it uses to control operation of a power consuming device 114. Thus, all recipients 110 participating in the load management program have their control periods for duty cycle controlled power consuming devices 114 synchronized. Because the control periods of power consuming devices 114 in multiple recipients 110 are synchronized, load diversity may be a concern. Accordingly, controller 112 includes a randomization algorithm, resulting in synchronized PWM randomization. In the exemplary embodiment, controller 112 is operable to receive a saturation signal from utility 102 to indicate an amount of power reduction desired by utility 102. Hence load coordination may be achieved.

Figure 2:
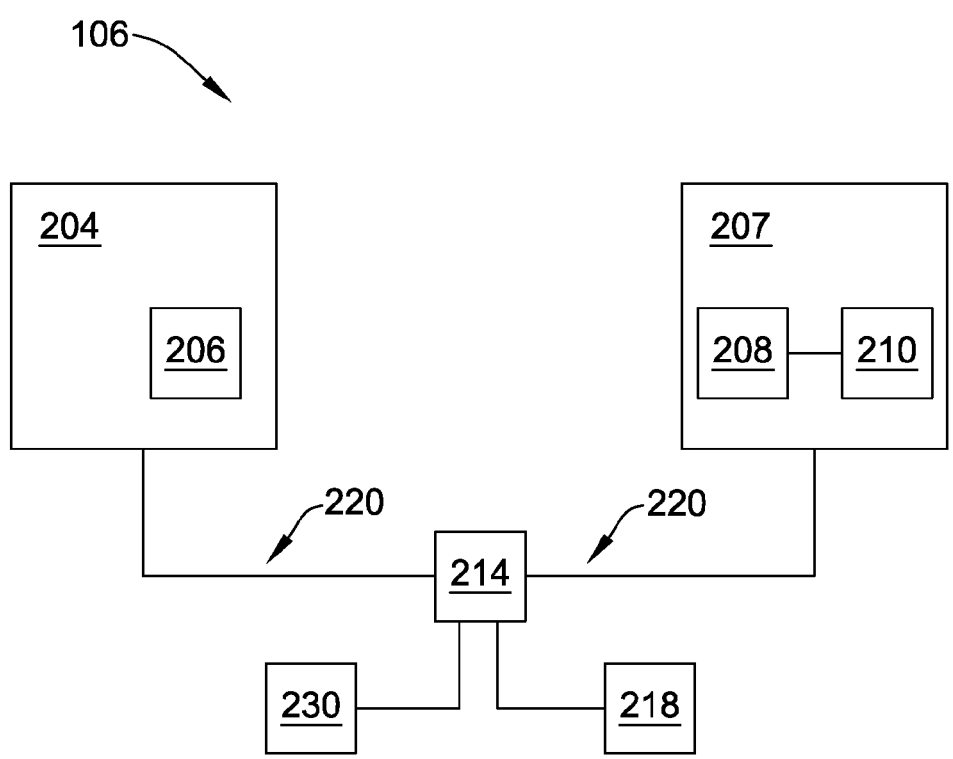

FIG. 2 is a block diagram of computing device 106. In the exemplary embodiment, computing device 106 includes a user interface 204 that receives at least one input from a user, such as an employee of utility 102 (shown in FIG. 1). In the exemplary embodiment, user interface 204 includes a keyboard 206 that enables the user to input pertinent information. Alternatively, user interface 204 may include, for example, a pointing device, a mouse, a stylus, a touch sensitive panel (e.g., a touch pad or a touch screen), a position detector, and/or an audio input interface (e.g., including a microphone).

Moreover, in the exemplary embodiment, computing device 106 includes a presentation interface 207 that presents information, such as input events and/or validation results, to the user. In the exemplary embodiment, presentation interface 207 includes a display adapter 208 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Computing device 106 also includes a processor 214 and a memory device 218. In the exemplary embodiment, processor 214 is coupled to user interface 204, presentation interface 207, and to memory device 218 via a system bus 220. In the exemplary embodiment, processor 214 communicates with the user, such as by prompting the user via presentation interface 207 and/or by receiving user inputs via user interface 204. Moreover, in the exemplary embodiment, processor 214 is programmed by encoding an operation using one or more executable instructions and providing the executable instructions in memory device 218.

The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 includes one or more devices that enable information, such as executable instructions and/or other data, to be stored and retrieved. Moreover, in the exemplary embodiment, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. More specifically, in the exemplary embodiment, memory device 218 stores input data received from a user via user interface 204, and/or information received from other components of demand response system 100 (shown in FIG. 1).

Computing device 106, in the exemplary embodiment, also includes a communication interface 230 that is coupled to processor 214 via system bus 220. Moreover, in the exemplary embodiment, communication interface 230 is communicatively coupled to user notification device 116 via network 118 (shown in FIG. 1). In the exemplary embodiment, communication interface 230 communicates with user notification device 116, and/or other components within system 100.

Figure 3:
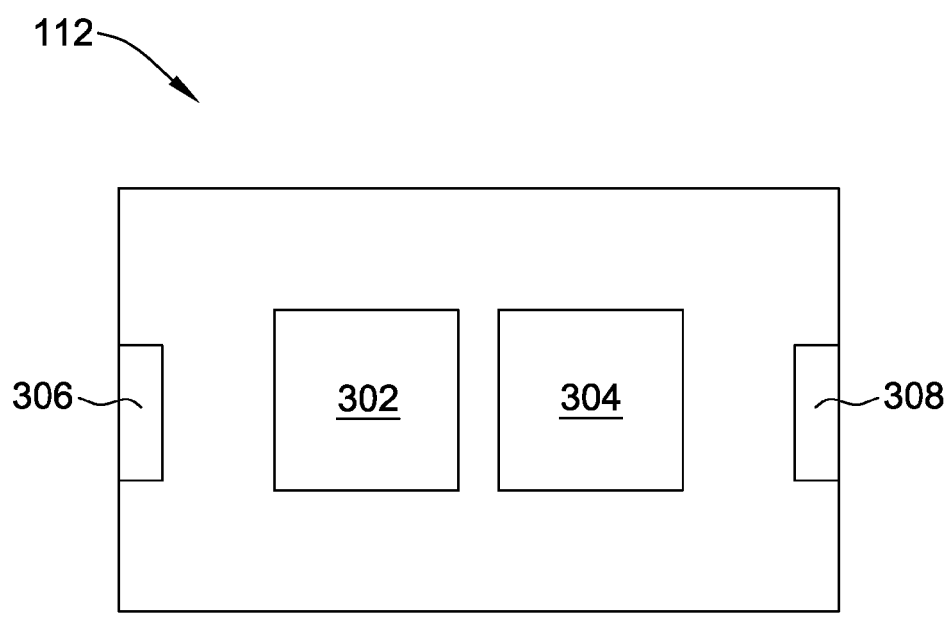

FIG. 3 illustrates an example controller 112 for controlling operation of one or more power device(s) 114. In this embodiment, controller 112 includes a processor 302, a memory device 304, an input 306, and an output 308.

Controller 112 is communicatively coupled to utility 102. More specifically, input 306 couples processor 302 to utility 102. Input 306 may be communicatively coupled to utility 102 directly or via one or more intermediary devices. For example, input 306 may be coupled to utility 102 directly via the Internet, wireless communication, or any other network. Alternatively, or additionally, input 306 may be coupled to utility 102 via an intermediary, such as user notification device 116. However connected, input 306 is coupled to receive one or more signals from utility 102. Although the embodiment shown in FIG. 3 includes a single input 306, controller 112 may include any suitable number of inputs 306.

Controller 112 is coupled to one or more power consuming devices 114 via output 308. Controller may thus control operation of power consuming devices 114 via output 308. Although a single output 308 is illustrated in the embodiment shown in FIG. 3, controller 112 may include any suitable number of outputs 308. For example, controller 112 may include a separate output 308 for each power consuming device 114 that it controls.

In the exemplary embodiment, processor 302 is programmed by encoding an operation using one or more executable instructions and providing the executable instructions in memory device 304. The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 304 includes one or more devices that enable information, such as executable instructions and/or other data, to be stored and retrieved. Moreover, in the exemplary embodiment, memory device 304 includes one or more non-transitory computer readable media, such as, without limitation, dynamic random access memory (DRAM), static random access memory (SRAM), a solid state disk, and/or a hard disk. In the exemplary embodiment, memory device 304 stores, without limitation, application source code, application object code, configuration data, additional input events, application states, assertion statements, validation results, and/or any other type of data. More specifically, in the exemplary embodiment, memory device 304 stores one or more algorithms for controlling operation of power consuming devices 114.

In use, referring to FIGS. 1, 2 and 3, power consuming devices 114 are controlled by controller 112 using a pulse width modulation control scheme. In general, power consuming devices are turned on and/or off for a portion of a control period, with the percentage of on time often referred to as a duty cycle. For example, if controller 112 determines to operate one of power consuming devices 114 at a fifty percent duty cycle, controller 112 will turn power consuming device 114 on for half of the control period and turn power consuming device 114 off for half of the control period. Generally, the order of the on and off portion of a control period does not matter. Further, one or more of the on time and the off time of power consuming device 114 may be split into two portions occurring at different times within the control period.

Unlike many devices controlled using pulse width modulation (PWM), power consuming devices 114 generally perform better if they are switched on and/or off relatively infrequently. For example, a compressor in an air conditioner generally should not be cycled off and on very frequently. Accordingly, the control period in the example embodiment is relatively long. Generally, the control period has a length measured in minutes rather than fractions of a second. In some embodiments, the control period is about fifteen minutes.

In the exemplary embodiment, utility 102 periodically transmits a control signal that represents the beginning of a control period. The control signal is received by controller 112 via input 306 and used to establish the control period it uses to control operation of a power consuming device 114 using PWM. Thus, all recipients 110 participating in the load management program have their control periods for controlling PWM controlled power consuming devices 114 synchronized.

Because the control periods of power consuming devices 114 in multiple recipients 110 are synchronized, load diversity may be a concern. If all devices 114 turn on (or turn off) at the beginning of a control period, electric network 108 may experience relatively large demand spikes at the beginning of a control period. In general, electric network 108 relies on different loads operating asynchronously, and in particular, HVAC systems operating at random times to help minimize demand spikes. Accordingly, controller 112 includes a randomization algorithm stored in memory device 304.

Generally, the randomization algorithm in each controller 112 randomizes the start time within a control period for the power consuming device 114 that it controls. Each controller 112 may randomize its start time independently, in conjunction with other controllers 112, or under the coordination of utility 102. As a result, start times for power consuming devices 114 are offset from the beginning of a control period and distributed throughout the control period, rather than being synchronized at the beginning of the control period.

Moreover, controller 112 is operable to receive a saturation signal from utility 102. The saturation signal is related to an amount of power reduction desired by utility 102. Generally, the saturation signal limits the maximum duty cycle for operation of power consuming devices 114 during a control period. Thus, utility 102 may monitor power demand during a control period and/or predict power demand during a next control period, and vary the saturation signal for the next control period as needed in order to maintain power demand at a desired level. Controller 112 may receive the saturation signal via input 306 or via a separate input (not shown).

Figure 4:
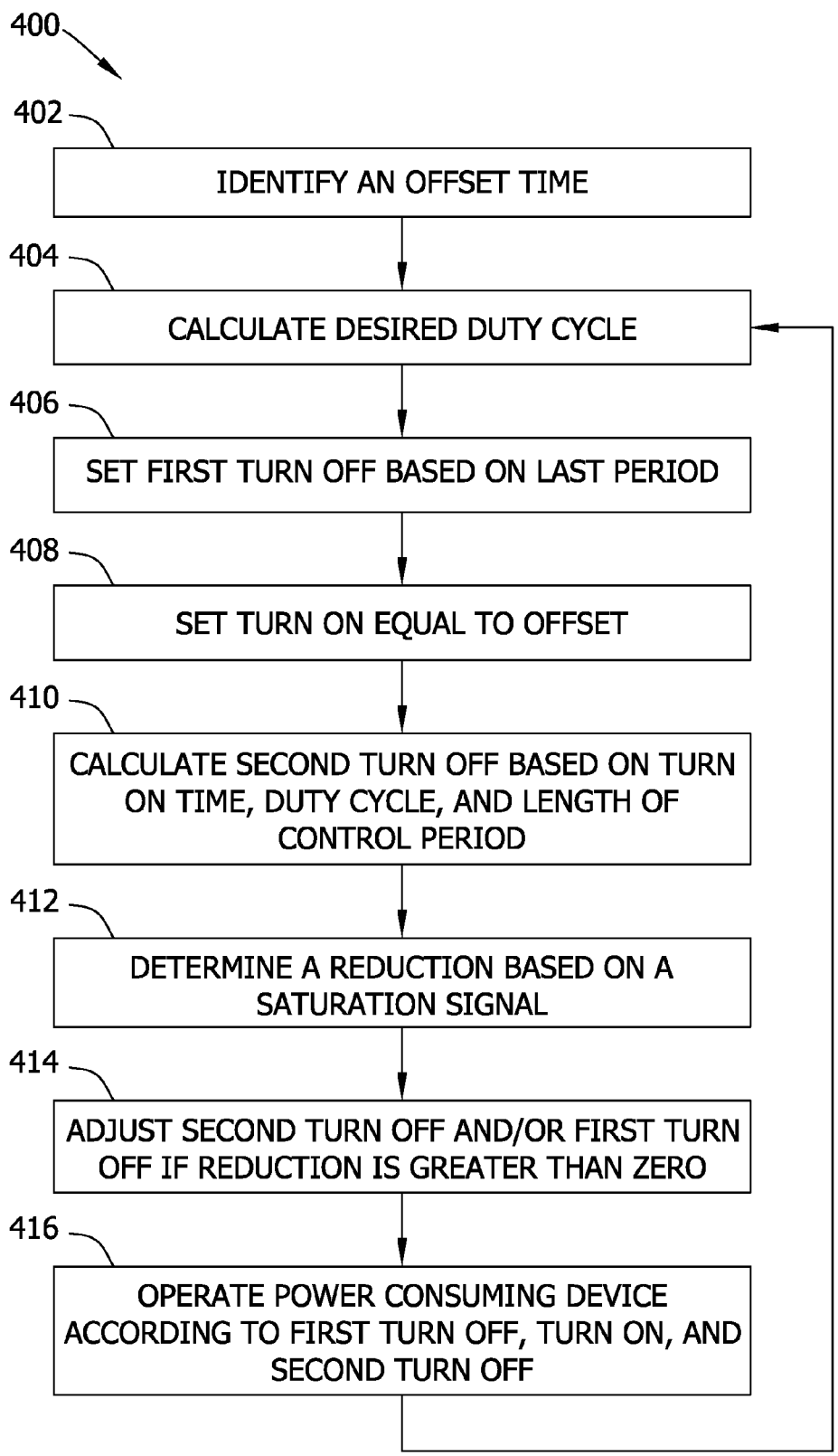

With reference now to FIG. 4, a method 400 for controlling power consuming device 114 will be described. In the exemplary embodiment, method 400 may be performed by controller 112. More specifically, an algorithm for performing method 400 may be stored in memory device 304 and processor 302 may be programmed to operate according to the stored algorithm.

Method 400 includes identifying 402 an offset time. The offset time may be identified by retrieving an offset time stored in memory device 306, receiving an offset time from an external source (such as utility 102, for example), randomly generating an offset time, selecting an offset time from a number of discrete offset times, etc. The offset time is greater than or equal to zero and less than the length of the control period. Generally, the offset time is a randomized offset time. The offset time may be randomized by any suitable randomization technique to achieve relatively even distribution of offset times among all power consuming devices 114 in system 100.

Controller 112 next calculates 404 a desired duty cycle for the next (or currently beginning) control period. Any suitable method for calculating a duty cycle for operation of power consuming device 114 may be used. One example of such a method is further described below. In general, controller 112 calculates a duty cycle to operate power consuming device 114 to achieve a desired result. For example, controller 112 may calculate a duty cycle for an air conditioner to achieve a desired temperature setpoint, which may be selected by a user, within recipient 110. Controller 112 may calculate 404 the desired duty cycle for the next control period during a current control period or may calculate 404 the desired duty cycle for a control period upon receipt of a control signal from utility 102 indicating the beginning of the control period.

Controller sets 406 a first turn off of power consuming device 114 based on the last control period and sets 408 the previously identified 402 offset as the turn on time for power consuming device 114. More specifically, and as will be described below, a carryover value is determined in each control period that indicates how far, if at all, into the next control period power consuming device 114 should remain on. The first turn off in the current control period is set 406 equal to the carryover value.

The second turn off of the power consuming device 114 is calculated 410 based on the turn on time, the duty cycle and the length of the control period. More specifically, in the example embodiment, the second turn off time is calculated 410 as the offset time added to the product of the duty cycle and the length of the control period. If the second turn off time extends beyond the end of the control period, the second turn off time is set equal to the end of the control period and a carryover value is set equal to the difference between the initially calculated second turn off and the length of the control period.

Controller 112 determines 412 a reduction in response to a saturation signal. As described above, the saturation signal is received by controller 112 from utility 102 and indicates a maximum duty cycle permitted during the control period. The reduction is calculated by adding the first and second off times and subtracting the on time. This result is the total time the power consuming device 114 would be on during the control period. The product of the saturation signal and the length of the period is subtracted from this result. Generally, if the saturation signal indicates a duty cycle greater than or equal to the duty cycle determined by the controller 112, the calculated result will be less than or equal to zero, indicating that a reduction is not needed. A result greater than zero, which will occur when the saturation signal indicates a maximum duty cycle less than the duty cycle calculated by controller 112, indicates a reduction is needed.

If the determined 412 reduction is greater than zero, controller 112 adjusts 414 the first turn off time. Controller 112 reduces the first turn off time by the amount of the determined 412 reduction by setting the first turn off time equal to the first turn off time minus the reduction. If this results in a first turn off time that is less than zero, i.e. it would occur before the beginning of the control period, the second turn off time is also adjusted. The second turn off time is adjusted by setting it equal to the second turn off time added to the reduced (and now negative) first turn off time. The first turn off time is then set equal to zero. In either case, this will result in a shortening of the on time of power consuming device 114 during the control period and, thus, a decrease in the duty cycle to the limit imposed by the saturation signal.

Following the previously described steps, controller 112 operates power consuming device 114 according to the calculated first turn off time, turn on time, and second turn off time. At the end of the control period, controller 112 returns to calculate 404 a desired duty cycle for the next control period and the cycle repeats. As conditions vary, however, the saturation signal and calculated duty cycle may vary between control periods.

A numerical example of the previously described steps of method 400 will be described, with reference to FIGS. 1 and 4. The initial carryover value is thirty seconds and the control period has a length of fifteen minutes. Controller 112 has identified its randomized offset time as eight minutes and the saturation signal is forty percent. At the beginning of the control period, power consuming device 114 is on and controller 112 calculates 404 a desired duty cycle of fifty percent. Controller 112 sets 406 the first turn off time equal to the carryover value of thirty seconds and sets 408 the first turn on time equal to the offset of eight minutes. The second turn off time is calculated 410 as the sum of the eight minute offset (i.e., the turn on time) and the product of the fifty percent duty cycle and the fifteen minute control period. Thus, controller 112 calculates a second turn off time as fifteen minutes and thirty seconds. Because this value exceeds that fifteen minute control period, the second turn off is set equal to fifteen minutes and the carryover value is now set equal to thirty seconds.

Next the reduction is determined 412. The first and second off times, thirty seconds and fifteen minutes respectively, are added. The turn on time of eight minutes is subtracted from fifteen minutes and thirty seconds. From the result of seven and one-half minutes, the product of the forty percent saturation signal and the fifteen minute control period is subtracted. The result is a reduction of one minute and thirty seconds.

Because the reduction is a positive value (i.e., one and one-half minutes), a reduction is needed and at least one of the turn off times needs to be adjusted 414. First, the first turn off time is reduced by the determined 412 reduction. The half minute first turn off time minus the one and one-half minute reduction results in a first turn off time of negative one minute. Accordingly, the second turn off time of fifteen minutes is adjusted by adding the first turn off time (negative one minute) resulting in a second turn off time of fourteen minutes. The first turn off time is then set equal to zero.

Figure 5:
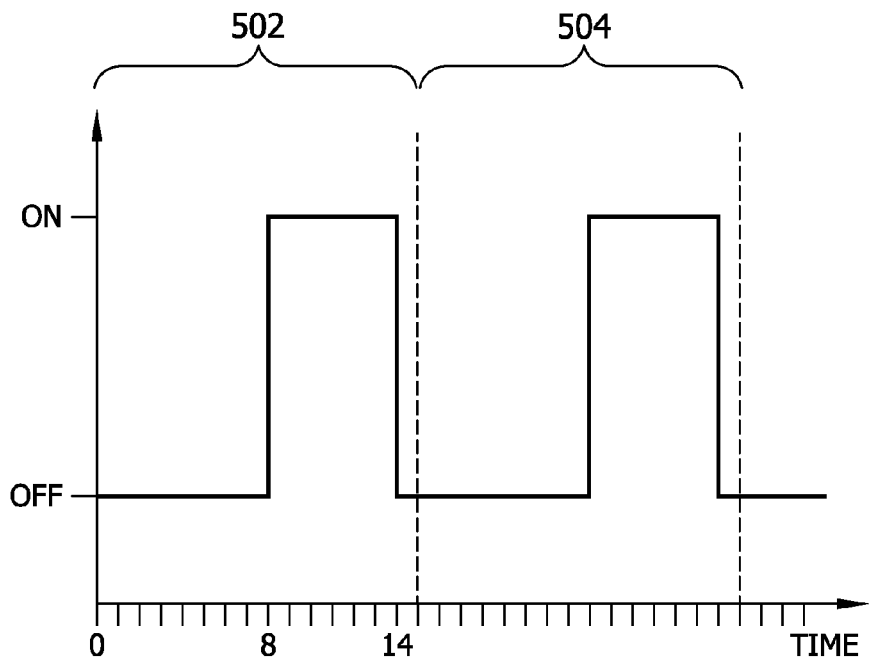

The controller 112 will then operate power consuming device 114 according to the first turn off time, the turn on time, and the second turn off time. FIG. 5 graphically represents this operation during a first control period 502 and a second control period 504. As shown, power consuming device 114 is turned off (or remains off) at zero minutes of first control period 502. At eight minutes of first control period 502 power consuming device 114 is turned on until the second turn off time. At the second turn off time, fourteen minutes into first control period 502, power consuming device 114 is again turned off and remains off until the end of first control period 502. As can be seen, this corresponds to a forty percent duty cycle (i.e. on for six minutes and off for nine minutes) as directed by the saturation signal. For this example, all variables (e.g., saturation signal, determined duty cycle, etc.) remain the same in the second control period.

A second numerical example will be described with reference to the graphical representation of the operation of power consuming device 114 shown in FIG. 6. For this example, the initial carryover value is two and one-half minutes and the control period has a length of fifteen minutes. Controller 112 has identified an offset time of ten minutes and the saturation signal is forty percent. At the beginning of the control period, power consuming device 114 is on and controller 112 calculates 404 a desired duty cycle of fifty percent. Controller 112 sets 406 the first turn off time equal to the carryover value of two and one-half and sets 408 the first turn on time equal to the offset of ten minutes. The second turn off time is calculated 410 as the sum of the ten minute offset (i.e., the turn on time) and the product of the fifty percent duty cycle and the fifteen minute control period. Thus, controller 112 calculates a second turn off time as seventeen minutes and thirty seconds. Because this value exceeds that fifteen minute control period, the second turn off is set equal to fifteen minutes and the carryover value is now set equal to two and one half minutes.

Next the reduction is determined 412. The first and second off times are added and the turn on time of ten minutes is subtracted from the result. From the result of seven and one-half minutes, the product of the forty percent saturation signal and the fifteen minute control period is subtracted. The result is a reduction of one minute and thirty seconds.

Because the reduction is a positive value (i.e., one and one-half minutes), a reduction is needed and at least one of the turn off times needs to be adjusted 414. First, the first turn off time is reduced by the determined 412 reduction. The two and one-half minute first turn off time minus the one and one-half minute reduction results in a first turn off time of one minute. Because this is not a negative value, the second turn off time of fifteen minutes does not need to be adjusted and the first turn off time does not need to be further adjusted.

Figure 6:
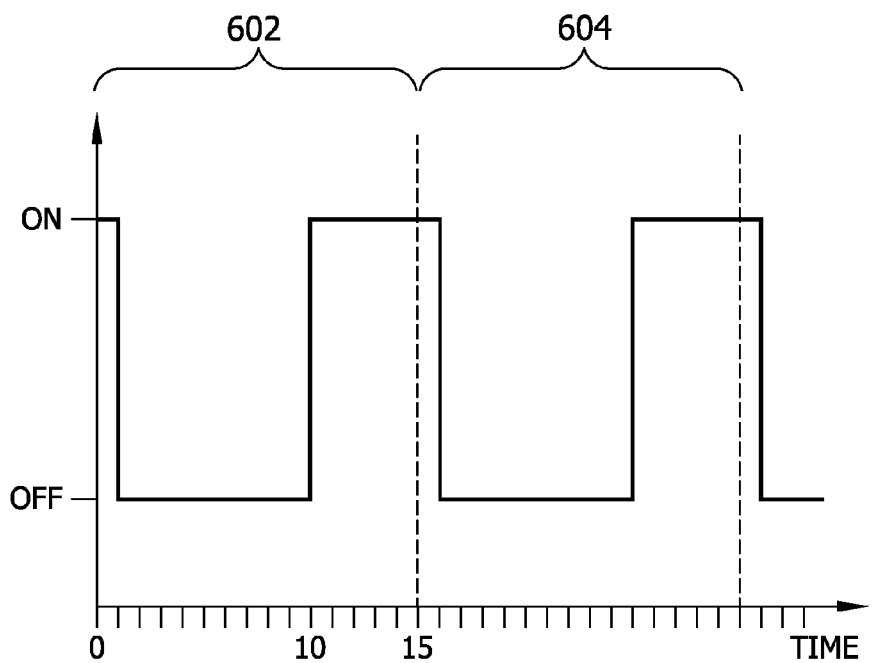

The resulting operation according to the first turn off time, the turn on time, and the second turn off time just calculated is graphically represented in FIG. 6 for a first control period 602 and a second control period 604. As shown, power consuming device 114 is on at zero minutes of first control period 602. First turn off time occurs at one minute. At ten minutes of first control period 602 power consuming device 114 is turned on again until the second turn off time. In this example, however, the second turn off time is the end of first control period 602 and power consuming device 114 is kept on so that it is on at the beginning of the second control period 604. As can be seen, this corresponds to a forty percent duty cycle (i.e. on for six minutes and off for nine minutes) as directed by the saturation signal, with the on time in a given control period being divided between the beginning and the end of the control period. Further, like FIG. 5, power consuming device 114 is operated in FIG. 6 with a forty percent duty cycle. However, because of the different offset, the turn on times shown in FIGS. 5 and 6 do not align with each other. Accordingly, such operation may help maintain load diversity. For this example, all variables (e.g., saturation signal, determined duty cycle, etc.) remain the same in the second control period 604.

Figure 7:
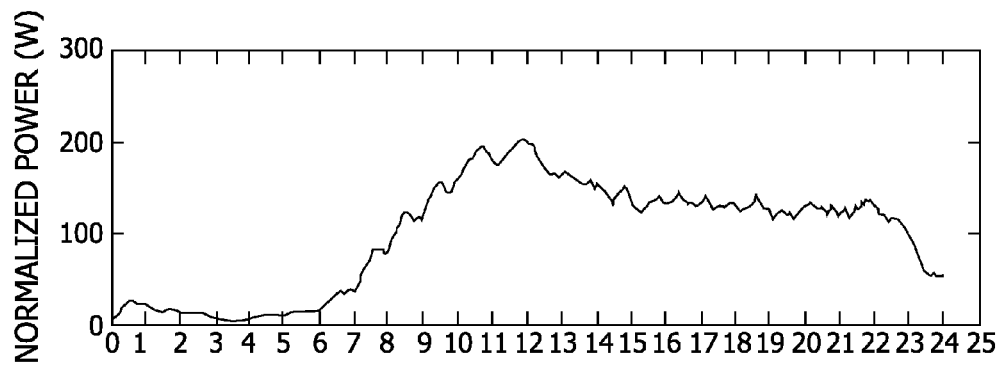
Figure 8:
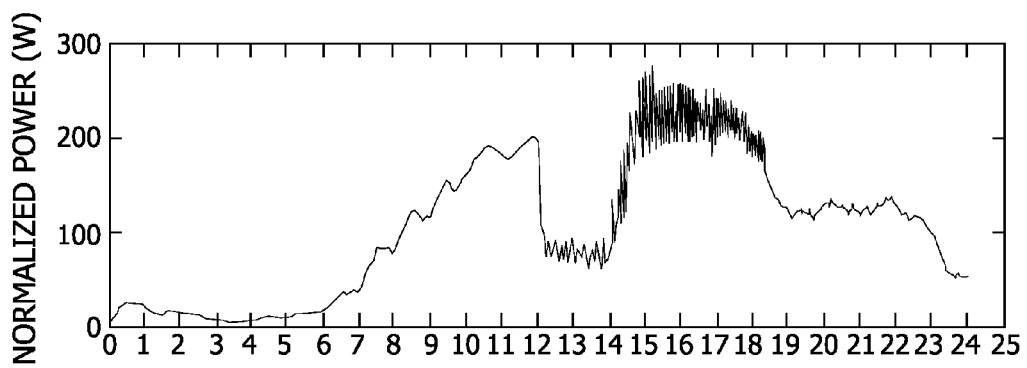
Figure 9:
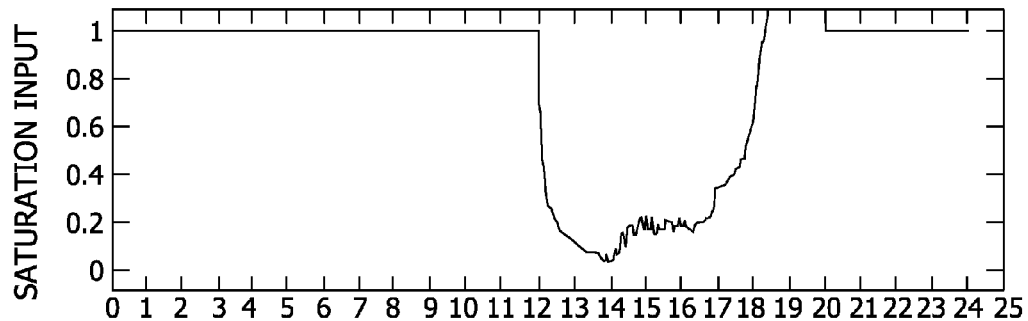

FIGS. 7 and 8 graphically illustrate results of simulated application the embodiments described herein to a population of twenty-thousand electric dryers over a twenty-four hour period. FIG. 7 illustrates the normalized power when the techniques described herein were not applied. Power demand in FIG. 7 is unconstrained. In FIG. 8, however, the techniques described herein (e.g., method 400) were applied to the population of dryers. The dryers were operated with PWM control and a saturation signal. The saturation signal is illustrated in FIG. 9. As can be seen, at about hour twelve the saturation signal begins to decrease from one hundred percent (no constraint). As a result the normalized power demand also decreases in FIG. 8. The saturation signal is periodically adjusted between hours twelve and fourteen to attempt to maintain a normalized power of about one hundred watts. As the saturation signal increases toward unconstrained operation after hour fourteen, the normalized power increases and exceeds the normalized power demanded by the unconstrained population in FIG. 7 until about hour eighteen. The total power demand over the twenty-four hour period is approximately the same in the unconstrained simulation of FIG. 7 and the simulation of FIGS. 8 and 9 applying the techniques described herein. As shown by FIG. 8, however, these techniques allow power demand to be reshaped.

The above-described embodiments allow synchronized control periods for populations of PWM controlled power consuming devices. The duty cycle permitted during any control period may be limited by a saturation signal. As such, power demand shaping can be achieved. Further, the power consuming devices have their start times randomly offset. Thus, load diversity is maintained on the electric network.

Exemplary embodiments of synchronized pulse width modulation randomization for load management are described above in detail. The apparatus and methods are not limited to the specific embodiments described herein, but rather, components of apparatus and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of controlling a power consuming device, said method comprising:
   receiving a control signal from a power supplying utility, the control signal signaling a beginning of a control period, the control period is generated using synchronized Pulse Width Modulation randomization;
   determining a length of time to operate the power consuming device during the control period;
   identifying an offset time;
   calculating a forthcoming start time for operation of the power consuming device as a function of the beginning of the control period and the offset time;
   calculating a forthcoming stop time for operation of the power consuming device as a function of the start time and the determined length of time to operate the power consuming device; and
   controlling a duty cycle of the power consuming device based on at least the calculated offset time, start time and stop time.

2. The method of claim 1, further comprising:
   receiving a saturation signal from the power supplying utility; and
   determining whether to change the identified stop time based at least in part on the saturation signal.

3. The method of claim 2, wherein said determining whether to change the identified stop time comprises determining whether to reduce the determined length of time to operate the power consuming device.

4. The method of claim 1, further comprising:
determining a random offset time less than a length of the control period, and wherein identifying an offset time comprises retrieving the determined random offset time.

5. The method of claim 1, further comprising:
operating the power consuming device based on the identified start time and the identified stop time.

6. The method of claim 1, wherein identifying a stop time comprises identifying a stop time for operation of the power consuming device as a function of the start time, the determined length of time to operate the power consuming device, and a length of the control period.

7. An apparatus for controlling operation of at least one power consuming device, said apparatus comprising:
an input for receiving a control signal from a power supplying utility;
a processor coupled in communication with said input;
a non-transitory computer readable medium coupled with said processor and containing instructions that, when executed by said processor, cause said processor to:
receive a control signal from a power supplying utility via said input, the control signal signaling a beginning of a control period, the control period is generated using synchronized Pulse Width Modulation randomization;
determine a length of time to operate a power consuming device during the control period;
identify an offset time; and
calculate a forthcoming start time for operation of the power consuming device as a function of the beginning of the control period and the offset time.

8. An apparatus in accordance with claim 7, wherein said non-transitory computer readable medium contains instructions that, when executed by said processor, cause said processor to:
identify a stop time for operation of the power consuming device as a function of the start time and the determined length of time to operate the power consuming device.

9. An apparatus in accordance with claim 8, wherein said non-transitory computer readable medium contains instructions that, when executed by said processor, cause said processor to:
receive a saturation signal from the power supplying utility; and
determine whether to change the identified stop time based at least in part on the saturation signal.

10. An apparatus in accordance with claim 9, wherein said non-transitory computer readable medium contains instructions that, when executed by said processor, cause said processor to:
determine whether to change the identified stop time by determining whether to reduce the determined length of time to operate the power consuming device.

11. An apparatus in accordance with claim 7, further comprising an output for coupling to a power consuming device, said processor communicatively coupled to said output.

12. An apparatus in accordance with claim 11, wherein said non-transitory computer readable medium contains instructions that, when executed by said processor, cause said processor to:
control operation of the power consuming device via said output based, at least in part, on the identified offset time and the determined length of time to operate the power consuming device.

13. An apparatus in accordance with claim 7, wherein said non-transitory computer readable medium contains instructions that, when executed by said processor, cause said processor to:
identify an offset time by retrieving a random offset time stored in said memory device.

14. An apparatus in accordance with claim 7, wherein said non-transitory computer readable medium contains instructions that, when executed by said processor, cause said processor to:
determine a random offset time less than a length of the control period.

15. An apparatus in accordance with claim 14, wherein said non-transitory computer readable medium contains instructions that, when executed by said processor, cause said processor to:
identify an offset time by retrieving the random offset time.

16. A method of controlling power demand on a network using synchronized pulse width modulation (PWM) signals, said method comprising:
determining a demanded power target;
transmitting a control signal to a plurality of customers, the control signal indicating the beginning of a control period, the control period is generated using synchronized Pulse Width Modulation randomization;
transmitting a saturation signal to the plurality of customers, the saturation signal representing a power usage threshold for each customer during the control period, the saturation signal configured to limit a maximum duty cycle for operation of at least one power consuming device for the customer during the control period;
monitoring power consumption on the network during the control period; and
determining whether the monitored power consumption on the network is about equal to the demanded power target.

17. The method of claim 16, wherein transmitting a control signal to a plurality of customer comprises periodically transmitting the control signal to the plurality of customers, each transmission of the control signal indicating the beginning of a control period.

18. The method of claim 17, further comprising adjusting the saturation signal if the monitored power consumption on the network differs from the demanded power target.

19. The method of claim 18, wherein the saturation signal has a value and wherein said adjusting the saturation signal comprises selecting a new value for the saturation signal.

20. The method of claim 19, wherein said adjusting the saturation signal comprises selecting a new value for the saturation signal from a plurality of discrete values.

* * * * *